Patented Feb. 21, 1933

1,898,425

UNITED STATES PATENT OFFICE

ROBERT COWEN AND ARTHUR D. JORDAN, OF FRANKLIN, MASSACHUSETTS, ASSIGNORS TO APPLETON RUBBER COMPANY, OF FRANKLIN, MASSACHUSETTS, A CORPORATION OF MASSACHUSETTS

SURFACING MATERIAL

No Drawing. Application filed December 13, 1930. Serial No. 502,247.

Our invention relates to improvements in surfacing material. This novel material has a broad field of usefulness, for example, as a covering on tennis courts, golf tees, and playing grounds.

The object of our invention is to provide such a covering that shall be sufficiently durable and tough, yet soft and resilient to pressure, to answer the requirements of such uses.

Our novel material is composed essentially of devulcanized scrap rubber and a suitable ligneous filler, which imparts to the material the desired qualities which are not possessed by the devulcanized rubber alone.

In producing our material, we make use of devulcanized scrap rubber, preferably obtained from discarded automobile tires, inner tubes and the like not only because it is cheap but because it has the qualities that are desirable for our purposes which are not possessed by crude rubber. The process of devulcanization is one of removal of the free or uncombined sulphur from previously vulcanized stock, or of causing such sulphur to combine with the unsaturated molecules of the rubber, oil being used to decrease the polymerization of the aggregated molecules. Hence the molecules contain more sulphur and there are a lesser number of polymerized aggregates.

Prior to our invention, this product has been considered unfit for any use requiring the qualities of toughness and durability. It is generally refined with the addition of oil, mixed with raw rubber, and revulcanized. But in our composition of matter we have found a way to obtain these qualities without revulcanization, so that our product is suited for uses to which previously known unvulcanized rubber materials have been unfit.

Devulcanized scrap rubber is inferior to crude rubber for most purposes, but we have found it peculiarly adapted to use in our composition of matter, in which combination its properties produce better results than are obtainable from crude rubber, and impart to the finished product certain qualities which are desirable in the uses for which we intend it, as well as effecting a considerable saving in the cost of material.

After devulcanization, we mill the scrap rubber with a ligneous material, having found the properties of this class of material peculiarly adapted to produce the result we seek, as well as being inexpensive. For example, we have obtained excellent results by the use of excelsior or sawdust. Various properties of the finished product such as its resistance to wear, toughness, softness and resiliency, may be accentuated by the use of one or another of these materials, or others of the same general class. We may use substantially equal parts by weight of scrap rubber and ligneous material, having obtained best results with from 45 to 50 per cent. of scrap rubber and 55 to 50 per cent. ligneous material. A preferred mixture, with which we have obtained excellent results, is 47% scrap rubber and 53% sawdust. But these proportions, as well as the specific ligneous material used, may be varied to accentuate or modify certain qualities of the finished product, without departing from the spirit of our invention. In substantially the preferred porportions, finely divided cork might be used in place of sawdust. In the milling process, these materials are ground and thoroughly mixed. The resulting plastic compound is then sheeted on a calendar to produce our material in sheets of the desired thickness.

Another method by which we may produce our composition of matter is to mix the ground scrap rubber with the ligneous material, before devulcanization of the rubber. In this case we may add a small amount (about 5%) of a resin base oil, or similar resinous product commonly used in devulcanization, to the mixture during or before mixing. The resulting compound is put through the ordinary devulcanization process, milled and sheeted.

A coloring material may also be incorporated in the product during the milling operation.

Normally, our composition of matter presents a somewhat soft and slightly tacky surface, desirable in its use as a surface for playing grounds such as golf tees. We have found that by coating this surface with a rubber varnish a comparatively smooth, hard surface may be imparted to the material, resembling that of a vulcanized rubber product. This surface adds to the wear resisting qualities of the material without impairing its other qualities. This result is of particular advantage when our material is to be used as an ordinary floor covering.

Our sheeted material is peculiarly adapted for use as a surface for golf teeing grounds.

It has in the past been customary to construct such grounds with a surface of grass or turf. As a result of the golf club head striking and digging into this surface, and the use of spiked shoes by many golf players, the grass surface is soon worn or dug away in spots, and the resulting surface is uneven and of varying firmness. Grass surfaced tees therefore require frequent attention and replacement, and at best are subject to the disadvantages of unevenness and varying firmness above referred to. To avoid the expense of keeping a grass surfaced tee in condition for play, tees are sometimes made with a clay or dirt surface. While less expensive, such a surface becomes uneven much more rapidly than even a grass surface, and requires almost constant attention; in dry weather the surface is blown away as dust, and in rainy weather puddles of water collect in depressions on the tee surface, which does not drain properly because of its unevenness. These disadvantages apply as well to any playing ground with a clay, dirt, or turf surface.

Our invention supplies an actual need of golf courses for a product that will give durable level surfaces for tees, which will be more economical and satisfactory than the usual grass tees now used and is readily penetrable by the spikes in the shoes usually worn by golfers. If the surface is unvarnished, it is so tacky that it provides a satisfactory grip by the soles of shoes which have no spikes. The common teelets in use on most golf courses can be inserted by hand in such surfaces, and mashie or niblick shots can be made from this surface with the same back spin effects as can be obtained from turf.

The material is so mobile and tacky that when the shoe spikes and teelet shanks are removed it closes together and closes the holes left thereby except for small superficial indentations.

Our invention is also adapted to be used as a surfacing material on other playing grounds.

Our composition of matter is a flexible, tough, resilient durable, soft or compressible, easily penetrable semi-elastic product. It combines the tough and durable qualities usually obtained only in rubber compounds when vulcanized, with the soft mobility and resiliency and the penetrability of devulcanized rubber. It differs from the former in its greater resilience, mobility, elasticity and penetrability and from the latter in its greater durability and toughness, and from both in its chemical and physical constitution and properties.

We claim:—

1. A flexible, tough, resilient, soft, semi-elastic unvulcanized surfacing material consisting of a compact, strongly coherent mixture of ground devulcanized scrap rubber and a filler composed largely of particles of ligneous matter, said rubber and filler being mixed in approximately equal proportions.

2. An unvulcanized tread surface comprising substantially equal parts of devulcanized scrap rubber and a filler including particles of ligneous material, mixed together, said tread surface being more wear-resisting than devulcanized rubber, the proportions of rubber and filler forming a body of a consistency permitting penetration by the shank of a golf tee under hand pressure and of a resilience tending to close holes so made therein.

3. A soft, resilient sheet of unvulcanized surfacing material comprising devulcanized scrap rubber and a filler composed largely of particles of ligneous material, mixed together in approximately equal proportions, and a surface coat of rubber varnish, whereby to form a sheet of greater durability and wear resistance than devulcanized rubber.

4. A flexible, tough, resilient, semi-elastic, unvulcanized surfacing material comprising a compact, strongly coherent mixture of devulcanized scrap rubber and particles of ligneous matter in approximately equal proportions.

5. A flexible, tough, resilient, semi-elastic, unvulcanized golf tee mat composed of substantially equal parts of devulcanized scrap rubber and sawdust, having a mass of a consistency penetrable by the shank of a golf teelet under hand pressure, of a resilience tending to close holes so made therein.

6. A flexible, tough, resilient, semi-elastic, unvulcanized tread surface composed of substantially equal parts of devulcanized scrap rubber and ground cork.

ROBERT COWEN.
ARTHUR D. JORDAN.